US012609469B2

(12) United States Patent
Su

(10) Patent No.: US 12,609,469 B2
(45) Date of Patent: Apr. 21, 2026

(54) BOARD-TO-BOARD CONNECTOR ASSEMBLY

(71) Applicant: Cheng Uei Precision Industry Co., LTD., New Taipei City (TW)

(72) Inventor: Yu-Hung Su, New Taipei City (TW)

(73) Assignee: CHENG UEI PRECISION INDUSTRY CO., LTD., New Taipei City (TW)

(*) Notice: Subject to any disclaimer, the term of this patent is extended or adjusted under 35 U.S.C. 154(b) by 311 days.

(21) Appl. No.: 18/395,481

(22) Filed: Dec. 23, 2023

(65) Prior Publication Data

US 2024/0305023 A1 Sep. 12, 2024

(30) Foreign Application Priority Data

Mar. 7, 2023 (CN) ......................... 202320414461.8

(51) Int. Cl.
*H01R 12/71* (2011.01)
*H01R 13/42* (2006.01)

(52) U.S. Cl.
CPC ........... *H01R 12/716* (2013.01); *H01R 13/42* (2013.01)

(58) Field of Classification Search
CPC .... H01R 12/716; H01R 13/42; H01R 12/707; H01R 12/73
See application file for complete search history.

(56) References Cited

U.S. PATENT DOCUMENTS

| | | | | |
|---|---|---|---|---|
| 6,093,046 | A * | 7/2000 | Chiou | H01R 13/6589 439/378 |
| 7,074,085 | B2 * | 7/2006 | Chen | H01R 13/658 439/108 |
| 7,771,227 | B1 * | 8/2010 | Yu | H01R 13/6273 439/510 |
| 2002/0177370 | A1 * | 11/2002 | Abbott | H01R 13/2421 439/700 |
| 2011/0076865 | A1 * | 3/2011 | Luo | H01R 12/585 439/82 |
| 2012/0055221 | A1 * | 3/2012 | Chiu | B21D 5/04 72/333 |

(Continued)

FOREIGN PATENT DOCUMENTS

CN 108631077 A 10/2018

*Primary Examiner* — Abdullah A Riyami
*Assistant Examiner* — Nader J Alhawamdeh
(74) *Attorney, Agent, or Firm* — Cheng-Ju Chiang

(57) ABSTRACT

A board-to-board connector assembly includes a plug connector, and a socket connector docked with the plug connector. The plug connector includes a first printed circuit board, a first insulating housing, a plurality of first terminals mounted in the first insulating housing, and two first fastening elements fastened to the first insulating housing. A top surface of the first printed circuit board is defined as a first mounting surface. The first insulating housing is disposed on the first mounting surface. The socket connector includes a second printed circuit board, a second insulating housing, a plurality of second terminals disposed in the second insulating housing, and two second fastening elements. A top surface of the second printed circuit board is defined as a second mounting surface. The second insulating housing is disposed to the second mounting surface. The two second fastening elements are fastened in the second insulating housing.

18 Claims, 14 Drawing Sheets

(56) References Cited

U.S. PATENT DOCUMENTS

| | | | | |
|---|---|---|---|---|
| 2013/0023162 | A1* | 1/2013 | Harlan | H01R 24/60 439/660 |
| 2017/0237190 | A1* | 8/2017 | Liao | H01R 12/79 439/64 |
| 2021/0098952 | A1* | 4/2021 | Sloey | H01R 12/78 |
| 2024/0305023 | A1* | 9/2024 | Su | H01R 12/73 |

* cited by examiner

BOARD-TO-BOARD CONNECTOR ASSEMBLY

CROSS-REFERENCE TO RELATED APPLICATION

The present application is based on, and claims priority from, China Patent Application No. 202320414461.8, filed Mar. 7, 2023, the disclosure of which is hereby incorporated by reference herein in its entirety.

BACKGROUND OF THE INVENTION

1. Field of the Invention

The present invention generally relates to a board-to-board connector assembly, and more particularly to a board-to-board connector assembly which is capable of reducing a distance between two printed circuit boards of the board-to-board connector assembly.

2. The Related Art

A board-to-board connector assembly is commonly used to an electronic device, such as a mobile phone or a camera. The board-to-board connector assembly is used for connecting two facing printed circuit boards. In the board-to-board connector assembly, one printed circuit board has a plug, and the other printed circuit board has a socket. The plug is connected with the socket, so electronic circuits of the two printed circuit boards are connected to each other.

A conventional board-to-board connector assembly is mounted to the electronic device. The conventional board-to-board connector assembly includes a first board connector, the two facing printed circuit boards and a second board connector. The first board connector includes a first insulating housing and a plurality of first terminals. The first insulating housing has a first groove. Each first terminal has a first contacting portion. The first contacting portion extends to the first groove. Two ends of the two printed circuit boards are inserted into the first groove of the first insulating housing. The two printed circuit boards are equipped with a plurality of first contacting points and a plurality of second contacting points. The plurality of the first contacting points are electrically connected with the plurality of the second contacting points. The first contacting portions of the plurality of the first terminals contact with the plurality of the first contacting points. The second board connector includes a second insulating housing and a plurality of second terminals. The second insulating housing has a second groove. Each second terminal has a second contacting portion. The second contacting portion extends to the second groove. The other two ends of the two printed circuit boards are inserted into the second groove of the second insulating housing. The second contacting portions of the plurality of the second terminals contact with the plurality of the second contacting points.

However, a plug and a socket of the conventional board-to-board connector assembly are mounted to two facing surfaces of the two printed circuit boards, respectively. When the two printed circuit boards are connected with each other, an overall height of the plug and the socket forms an assembly distance between the two printed circuit boards. Therefore, the assembly distance between the two printed circuit boards are larger, and the two printed circuit boards of the conventional board-to-board connector assembly require a large assembly space, so that a thickness of the electronic device is unable to be reduced.

Thus, in order to solve an assembly space limitation, it is essential to provide an innovative board-to-board connector assembly which is used in an electronic device. The innovative board-to-board connector assembly is capable of reducing an assembly distance between two printed circuit boards of the innovative board-to-board connector assembly, so that a thickness of the electronic device is able to be reduced for reaching a thin type product requirement and a thin type product application.

SUMMARY OF THE INVENTION

An object of the present invention is to provide a board-to-board connector assembly which is capable of reducing a distance between two printed circuit boards of the board-to-board connector assembly. The board-to-board connector assembly includes a plug connector, and a socket connector docked with the plug connector. The plug connector includes a first printed circuit board, a first insulating housing, a plurality of first terminals, and two first fastening elements fastened to two opposite ends of the first insulating housing, respectively. A top surface of the first printed circuit board is defined as a first mounting surface. The first insulating housing is disposed on the first mounting surface. Two opposite ends of the first insulating housing have two first locating grooves penetrating through a top surface and a bottom surface of the first insulating housing, respectively. The plurality of the first terminals are mounted in the first insulating housing. Each first fastening element has a first main portion. A top end of the first main portion is connected with a first assembling portion. A bottom end of the first main portion is connected with a first soldering foot. The two first assembling portions of the two first fastening elements are inserted into the two first locating grooves. The socket connector includes a second printed circuit board, a second insulating housing, a plurality of second terminals and two second fastening elements. A top surface of the second printed circuit board is defined as a second mounting surface. A bottom surface of the second printed circuit board is defined as a mating surface. The second mounting surface faces away from the first mounting surface. The mating surface faces the first mounting surface. The second printed circuit board has a penetrating groove penetrating through the second mounting surface and the mating surface. The second insulating housing is disposed to the second mounting surface. The second insulating housing passes through the penetrating groove and then projects beyond the mating surface. The second insulating housing is connected with the first insulating housing. Two top surfaces of two opposite ends of the second insulating housing are recessed downward to form two concave surfaces, respectively. Two outer ends of the two concave surfaces define two first buckling grooves vertically penetrating through the two opposite ends of the second insulating housing. Two inner ends of the two concave surfaces are recessed downward to form two second buckling grooves. The plurality of the second terminals are disposed in the second insulating housing. The plurality of the second terminals are connected with the plurality of the first terminals. The two second fastening elements are fastened in the two concave surfaces of the second insulating housing, respectively. Each second fastening element has a second main portion, the two second main portions of the two second fastening elements are disposed on the two concave surfaces. One end of the second main portion is connected with a second assembling portion. The two second assembling portions of the two second fastening elements are disposed in the two second buckling grooves of the second insulating housing. The other end of the second main portion is connected with a second soldering foot. The two second soldering feet pass downward through the two first buckling grooves of the second insulating housing. The two second soldering feet project out of two lower portions of the second insulating housing. The two second soldering feet penetrate through the second printed circuit board, and the two second soldering feet project beyond the mating surface.

Another object of the present invention is to provide a board-to-board connector assembly. The board-to-board connector assembly includes a plug connector, and a socket connector docked with the plug connector. The plug connector includes a first printed circuit board, a first insulating housing, a plurality of first terminals, and two first fastening elements fastened to two opposite ends of the first insulating housing, respectively. A top surface of the first printed circuit board is defined as a first mounting surface. The first printed circuit board has two location holes penetrating through the first mounting surface and a bottom surface of the first printed circuit board. The first insulating housing is disposed on the first mounting surface. The first insulating housing has a first base portion. A front end and a rear end of a top surface of the first base portion extend upward to form two first fastening pillars, respectively. A front end and a rear end of a bottom surface of the first base portion extend downward to form two second fastening pillars, respectively. The two first fastening pillars are corresponding to the two second fastening pillars along an up-down direction. The two location holes are corresponding to the two second fastening pillars. The two second fastening pillars are disposed in the two location holes. The plurality of the first terminals are mounted in the first insulating housing. The socket connector includes a second printed circuit board, a second insulating housing, a plurality of second terminals and two second fastening elements. A top surface of the second printed circuit board is defined as a second mounting surface. A bottom surface of the second printed circuit board is defined as a mating surface. The second mounting surface faces away from the first mounting surface. The mating surface faces the first mounting surface. The second printed circuit board has a penetrating groove penetrating through the second mounting surface and the mating surface. The second insulating housing is disposed to the second mounting surface. The second insulating housing passes through the penetrating groove and then projects beyond the mating surface. The second insulating housing is connected with the first insulating housing. The second insulating housing has a second base portion. A front end and a rear end of a top surface of the second base portion extend upward and oppositely extend sideward to form two mounting portions, respectively. The two mounting portions are disposed to the second mounting surface of the second circuit board. The second base portion passes through the penetrating groove of the second printed circuit board, and then the second base portion protrudes beyond the mating surface of the second printed circuit board. The second insulating housing has two perforations penetrating through the two mounting portions, and a front end and a rear end of the second base portion, respectively. The two perforations are corresponding to the two first fastening pillars, respectively. The two first fastening pillars are inserted into the two perforations. The plurality of the second terminals are disposed in the second insulating housing. The plurality of the second terminals are connected with the plurality of the first terminals. The two second fastening elements are disposed to a front end and a rear end of a top surface of the second insulating housing.

Another object of the present invention is to provide a board-to-board connector assembly. The board-to-board connector assembly includes a plug connector, and a socket connector docked with the plug connector. The plug connector includes a first printed circuit board, a first insulating housing, a plurality of first terminals, and two first fastening elements fastened to two opposite ends of the first insulating housing, respectively. A top surface of the first printed circuit board is defined as a first mounting surface. A front end and a rear end of the first mounting surface of the first printed circuit board have two first location portions, respectively. The first insulating housing is disposed on the first mounting surface. The first insulating housing has a first base portion. Two opposite ends of the first insulating housing have two first locating grooves penetrating through a top surface and a bottom surface of the first insulating housing, respectively. The first insulating housing is disposed on the first mounting surface. The first insulating housing has a first base portion. Two opposite ends of the first insulating housing have two first locating grooves penetrating through a top surface and a bottom surface of the first insulating housing, respectively. The plurality of the first terminals are mounted in the first insulating housing. Each first fastening element has a first main portion. The two first main portions of the two first fastening elements are disposed to a front surface and a rear surface of the first base portion of the first insulating housing, respectively. A top end of the first main portion is bent inward to form a first bending portion. The two first bending portions of the two first fastening elements are fastened to a front end and a rear end of a top surface of the first base portion of the first insulating housing. An inner end of the first bending portion extends downward to form a first assembling portion. The two first assembling portions of the two first fastening elements are inserted into the two first locating grooves. A bottom end of the first main portion is bent outward to form a second bending portion. An outer end of the second bending portion extends outward to form a first soldering foot. The two first soldering feet of the two first fastening elements are fastened to the two first location portions. A bending direction of the first bending portion is opposite to a bending direction of the second bending portion. The socket connector includes a second printed circuit board, a second insulating housing, a plurality of second terminals and two second fastening elements. A top surface of the second printed circuit board is defined as a second mounting surface. A bottom surface of the second printed circuit board is defined as a mating surface. The second mounting surface faces away from the first mounting surface. The mating surface faces the first mounting surface. The second printed circuit board has a penetrating groove penetrating through the second mounting surface and the mating surface. The second insulating housing is disposed to the second mounting surface. The second insulating housing passes through the penetrating groove and then projects beyond the mating surface. The second insulating housing is connected with the first insulating housing. Two top surfaces of two opposite ends of the second insulating housing are recessed downward to form two concave surfaces, respectively. The plurality of the second terminals are disposed in the second insulating housing. The plurality of the second terminals are connected with the plurality of the first terminals. The two second fastening elements are fastened in the two concave surfaces, respectively.

As described above, the two mounting portions of the second insulating housing of the socket connector are disposed on the second mounting surface of the second printed circuit board, and the second base portion of the second insulating housing passes through the penetrating groove of the second printed circuit board to effectively reduce a distance between the first printed circuit board and the second printed circuit board, so the board-to-board connector assembly is capable of reducing a distance between two printed circuit boards of the board-to-board connector assembly which are the first printed circuit board and the second printed circuit board, and an assembly space between the first printed circuit board and the second printed circuit board of the board-to-board connector assembly is decreased. Furthermore, the two second soldering feet of the two second fastening elements of the socket connector penetrate through the two first buckling grooves of the two mounting portions of the second insulating housing and two second location portions of the second printed circuit board, and the two second soldering feet of the two second fastening elements of the socket connector are soldered in the two second location portions of the second printed circuit board, so the socket connector is more stably mounted on the second printed circuit board. In addition, when the board-to-board connector assembly is assembled, the two first fastening pillars of the first insulating housing of the plug connector are inserted into the two perforations of the second insulating housing from a bottom surface of the second insulating housing of the socket connector, the two perforations penetrate through the top surface of the second insulating housing. Thus, whether the two first fastening pillars of the first insulating housing are inserted into the two perforations of the second insulating housing from the top surface of the second insulating housing is sighted so as to judge whether the board-to-board connector assembly completes aligning a position.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
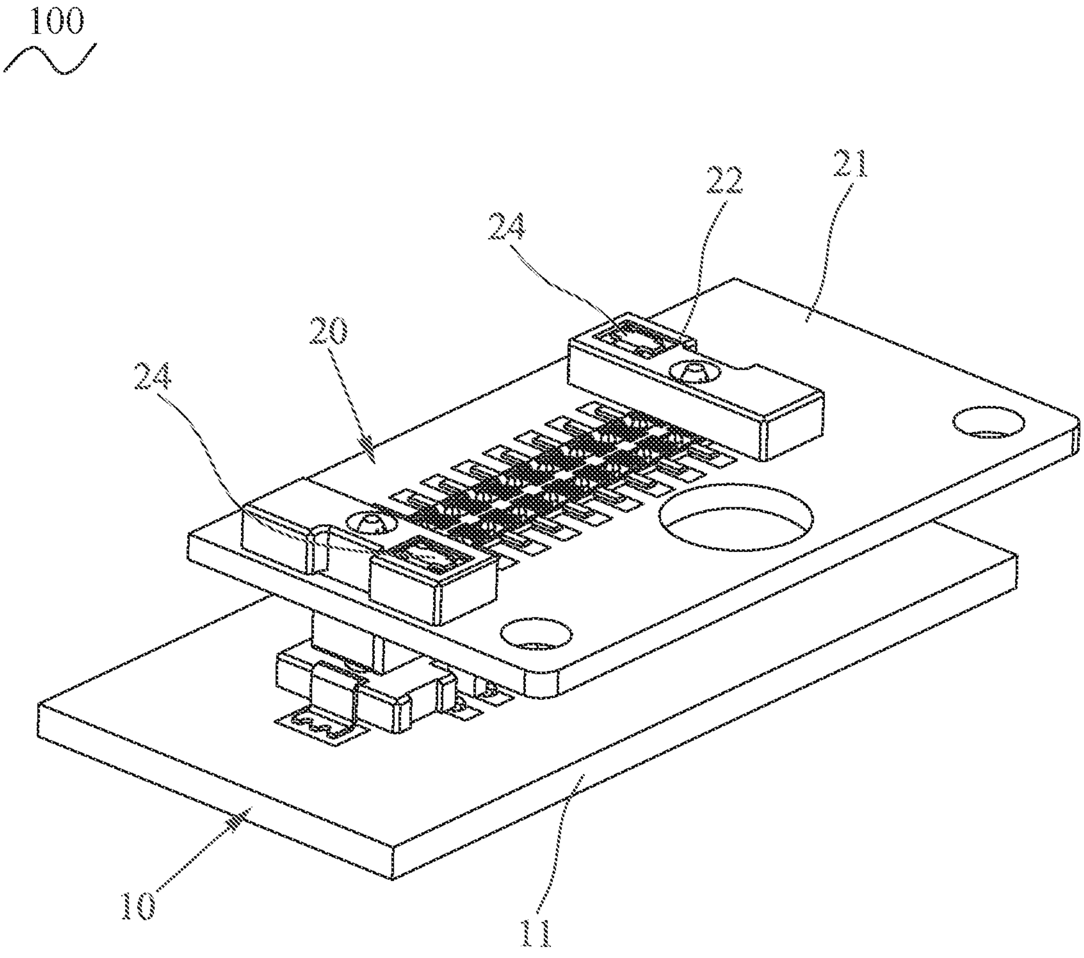
FIG. 1 is a perspective view of a board-to-board connector assembly in accordance with a preferred embodiment of the present invention.
Figure 2:
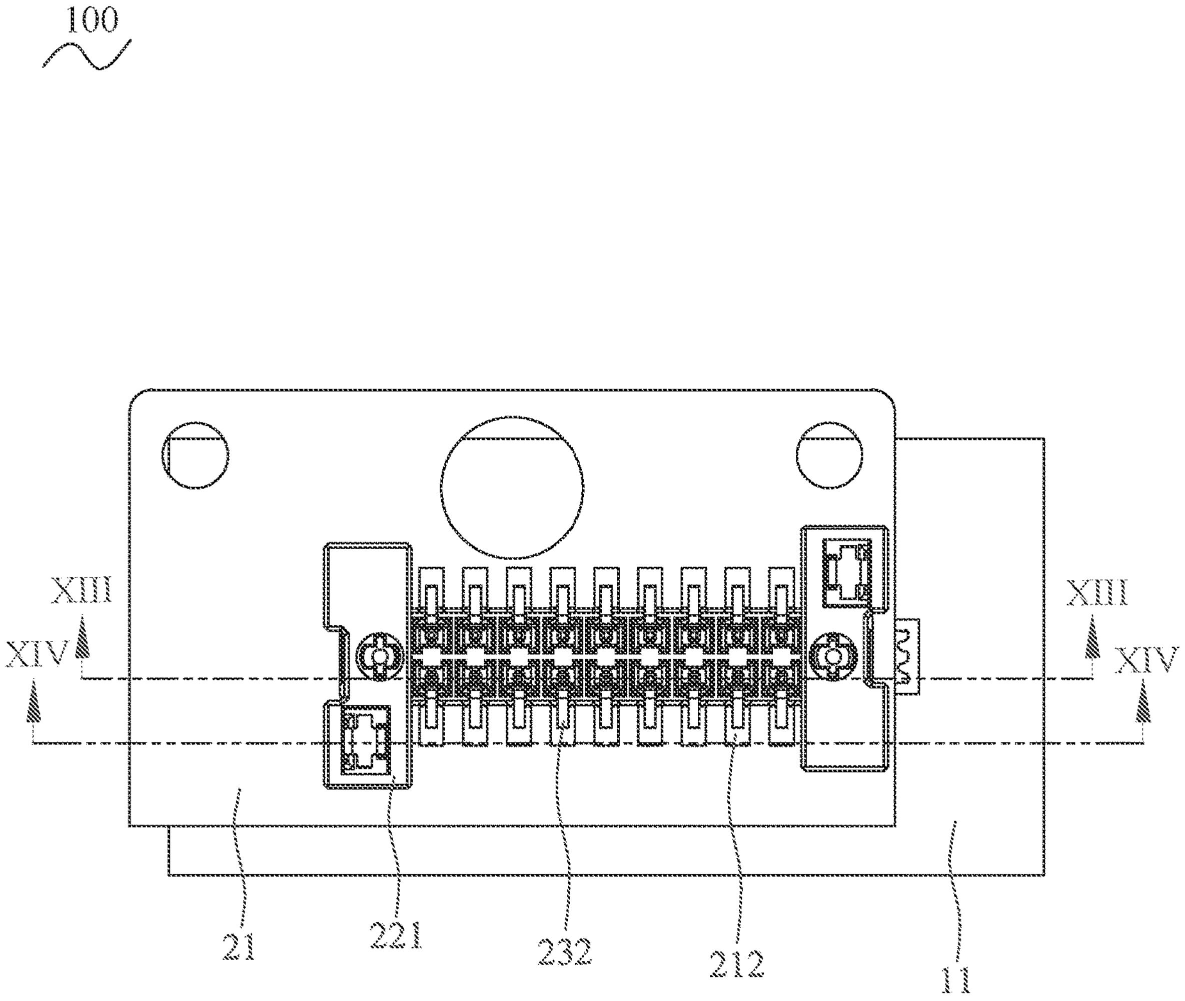
FIG. 2 is a diagrammatic drawing of the board-to-board connector assembly of FIG. 1.

With reference to FIG. 1, a board-to-board connector assembly 100 in accordance with a preferred embodiment of the present invention is shown. The board-to-board connector assembly 100 includes a plug connector 10 and a socket connector 20. The socket connector 20 is docked with the plug connector 10 to form the board-to-board connector assembly 100.

Figure 3:
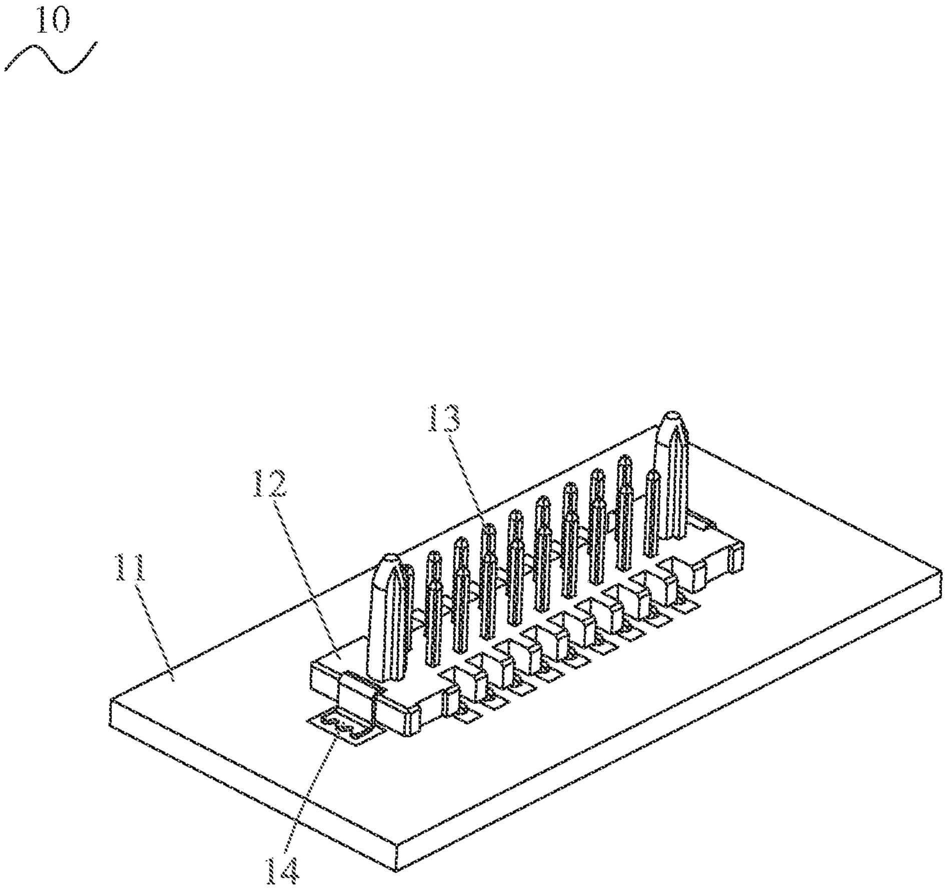
FIG. 3 is a perspective view of a plug connector of the board-to-board connector assembly of FIG. 1.

With reference to FIG. 3, the plug connector 10 includes a first printed circuit board 11, a first insulating housing 12, a plurality of first terminals 13 and two first fastening elements 14. The first insulating housing 12 is disposed on the first printed circuit board 11. The first insulating housing 12 is fastened to a top surface of the first printed circuit board 11. The plurality of the first terminals 13 are mounted in the first insulating housing 12. The plurality of the first terminals 13 are surrounded by the first insulating housing 12. The plurality of the first terminals 13 are soldered to the top surface of the first printed circuit board 11. The two first fastening elements 14 are fastened to two opposite ends of the first insulating housing 12, respectively. The two first fastening elements 14 are fastened to a front end and a rear end of the first insulating housing 12, respectively. The two first fastening elements 14 are fastened to the top surface of the first printed circuit board 11.

With reference to FIG. 8 to FIG. 13, the socket connector 20 is disposed on the plug connector 10. The socket connector 20 includes a second printed circuit board 21, a second insulating housing 22, a plurality of second terminals 23 and two second fastening elements 24. In the preferred embodiment, the second insulating housing 22 penetrates through a middle of the second printed circuit board 21, the first printed circuit board 11 is opposite to the second printed circuit board 21, so a distance between the first printed circuit board 11 and the second printed circuit board 21 is short, and a usage space of the board-to-board connector assembly 100 is reduced. The plurality of the second terminals 23 are disposed in the second insulating housing 22. The plurality of the second terminals 23 are surrounded by the second insulating housing 22. The two second fastening elements 24 are disposed to a front end and a rear end of a top surface of the second insulating housing 22, respectively. The first insulating housing 12 of the plug connector 10 is docked with the second insulating housing 22 of the socket connector 20. The plurality of the first terminals 13 of the plug connector 10 are docked with the plurality of the second terminals 23 of the socket connector 20. The plurality of the second terminals 23 of the socket connector 20 are connected with the plurality of the first terminals 13 of the plug connector 10.

Figure 4:
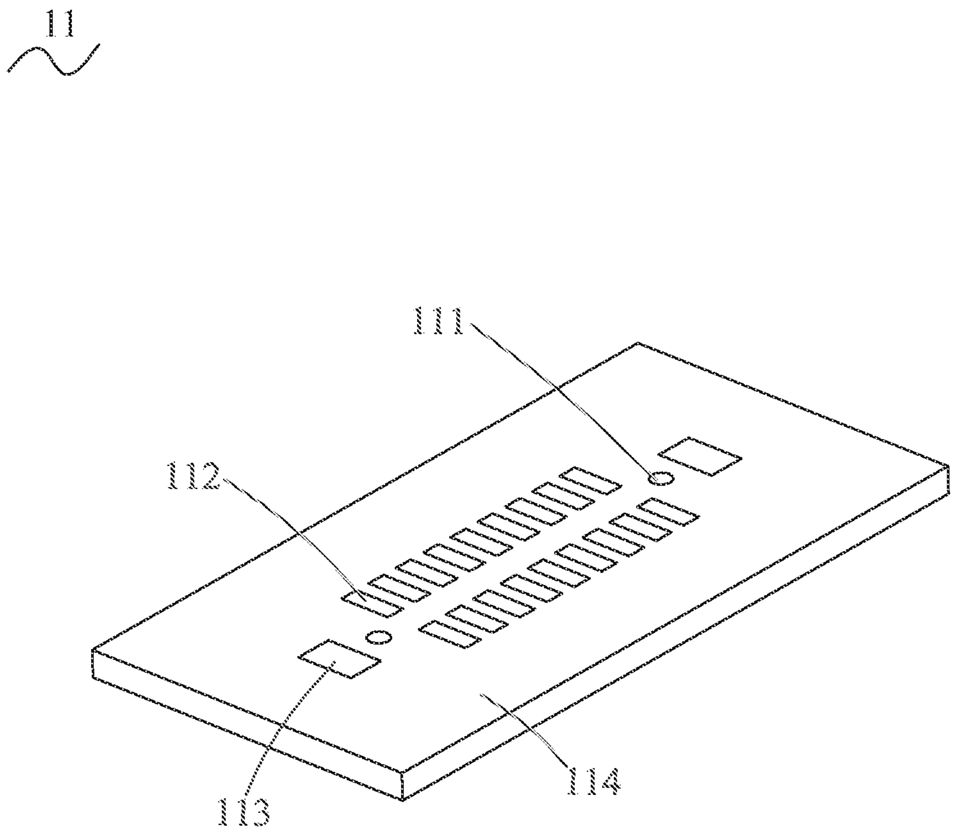
FIG. 4 is a perspective view of a first printed circuit board of the plug connector of the board-to-board connector assembly of FIG. 1.

Referring to FIG. 4, the first printed circuit board 11 has two location holes 111, a plurality of first soldering zones 112, two first location portions 113 and a first mounting surface 114. In the preferred embodiment, a top surface of the first printed circuit board 11 is defined as the first mounting surface 114. The two location holes 111 penetrate through the first mounting surface 114 and a bottom surface of the first printed circuit board 11. The first insulating housing 12 is disposed on the first mounting surface 114. The two location holes 111 are corresponding to two corresponding mechanisms of the first insulating housing 12. A middle of the first mounting surface 114 of the first printed circuit board 11 has the plurality of the first soldering zones 112. A middle of the top surface of the first printed circuit board 11 has the plurality of the first soldering zones 112.

The first insulating housing 12, the plurality of the first terminals 13 and the two first fastening elements 14 are disposed on the first mounting surface 114. Corresponding sections of the plurality of the first terminals 13 are soldered to the plurality of the first soldering zones 112 of the first printed circuit board 11. A front end and a rear end of the first mounting surface 114 of the first printed circuit board 11 have the two first location portions 113, respectively. Two corresponding mechanisms of the two first fastening elements 14 are fastened to the two first location portions 113 to realize that the two first fastening elements 14 are located to the first printed circuit board 11, and the two first fastening elements 14 are fixed to the first printed circuit board 11. In the preferred embodiment, the plurality of the first soldering zones 112 are disposed between the two location holes 111. The plurality of the first soldering zones 112 and the two location holes 111 are disposed between the two first location portions 113.

Figure 5:
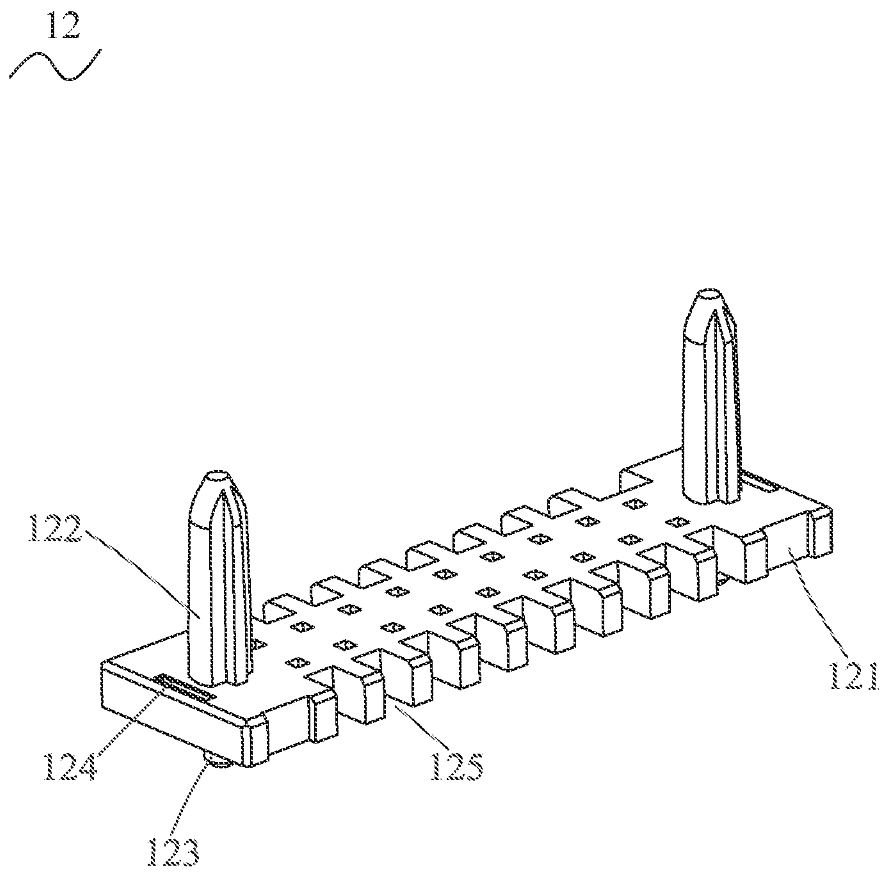
FIG. 5 is a perspective view of a first insulating housing of the plug connector of the board-to-board connector assembly of FIG. 1.
Figure 13:
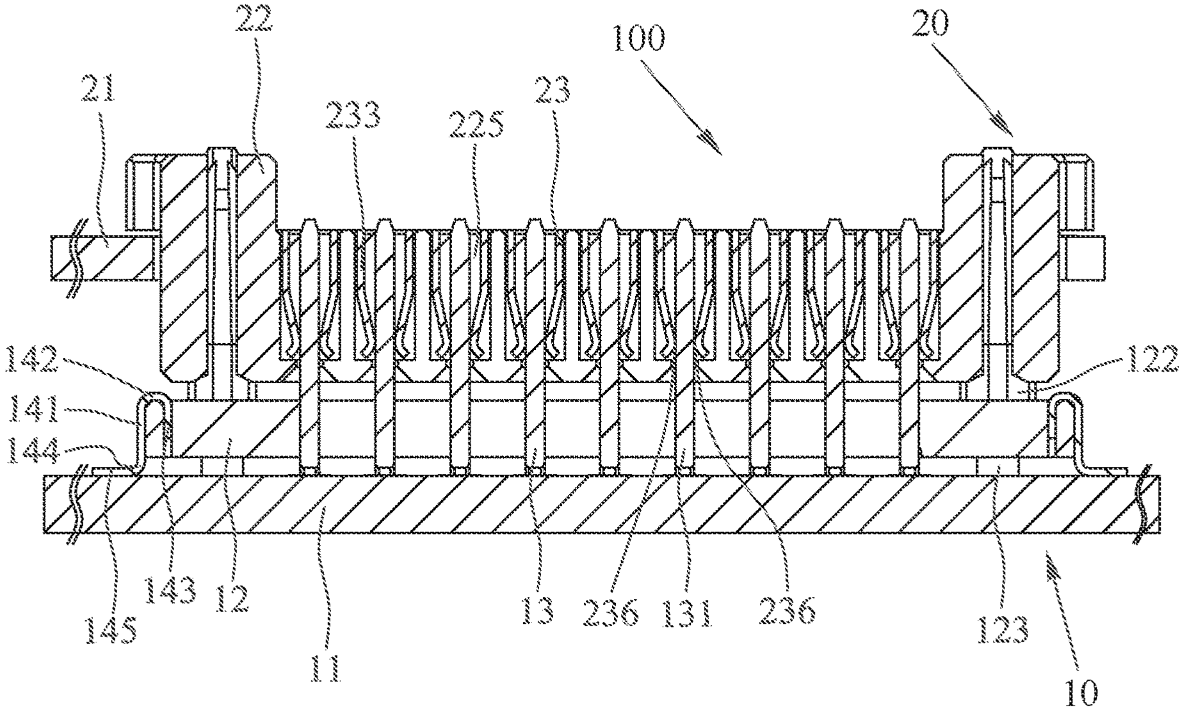
FIG. 13 is a sectional view of the board-to-board connector assembly along a line XIII-XIII of FIG. 2.
Figure 14:
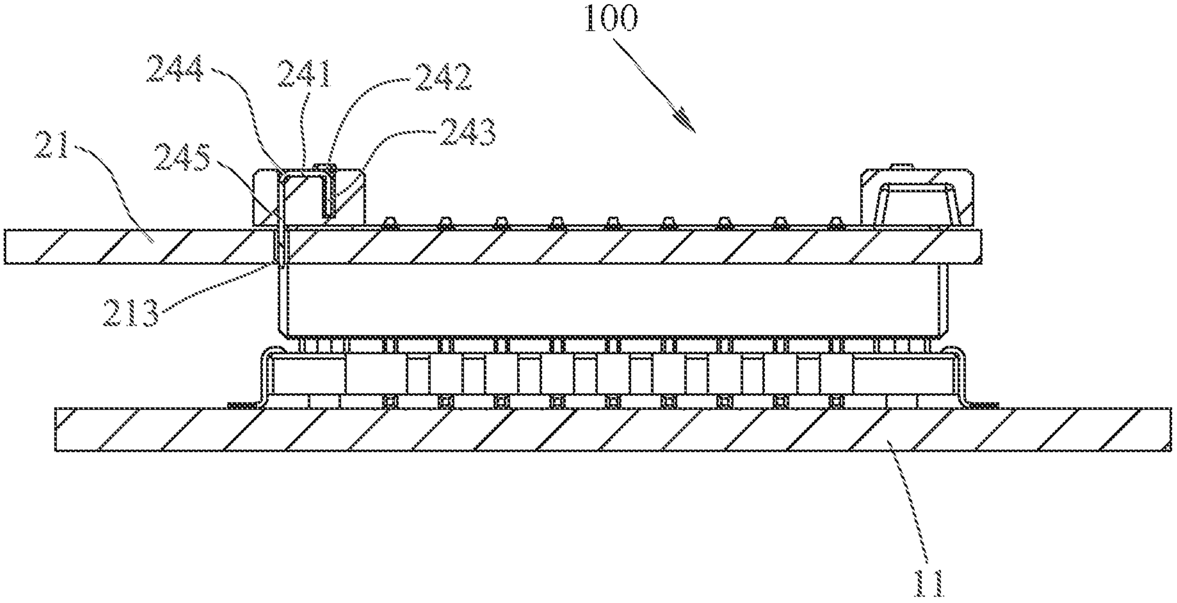
FIG. 14 is another sectional view of the board-to-board connector assembly along a line XIV-XIV of FIG. 2.

Referring to FIG. 5 and FIG. 13, the first insulating housing 12 has a first base portion 121, two first fastening pillars 122, two second fastening pillars 123, two first locating grooves 124 and a plurality of lacking grooves 125. A front end and a rear end of a top surface of the first base portion 121 extend upward to form the two first fastening pillars 122, respectively. The two first fastening pillars 122 are disposed in a corresponding mechanism of the socket connector 20 to realize that the socket connector 20 is located to the plug connector 10, and the socket connector 20 is fixed to the plug connector 10. A front end and a rear end of a bottom surface of the first base portion 121 extend downward to form the two second fastening pillars 123, respectively. The two location holes 111 are corresponding to the two second fastening pillars 123. The two second fastening pillars 123 are disposed in the two location holes 111 of the first printed circuit board 11 to realize that the first insulating housing 12 is located to the first printed circuit board 11, and the first insulating housing 12 is fixed to the first printed circuit board 11.

In the preferred embodiment, the two first fastening pillars 122 are corresponding to the two second fastening pillars 123 along an up-down direction. The two first fastening pillars 122 are aligned with the two second fastening pillars 123 along the up-down direction. The two opposite ends of the first insulating housing 12 have the two first locating grooves 124 penetrating through a top surface and a bottom surface of the first insulating housing 12, respectively. A front end and a rear end of the first insulating housing 12 have the two first locating grooves 124 penetrating through the top surface and the bottom surface of the first base portion 121 of the first insulating housing 12, respectively. The two first fastening elements 14 are fastened in the two first locating grooves 124 to realize that the two first fastening elements 14 are located to the first insulating housing 12. Several portions of two opposite sides of the first insulating housing 12 are recessed inward to form the plurality of the lacking grooves 125. When the plug connector 10 is assembled, an automatic assembly machine (not shown) utilizes the plurality of the lacking grooves 125 to assemble the board-to-board connector assembly 100 and align a position of the board-to-board connector assembly 100. In a concrete implementation, the automatic assembly machine is without being limited to utilize the plurality of the lacking grooves 125 to assemble the board-to-board connector assembly 100 and align the position of the board-to-board connector assembly 100.

Figure 6:
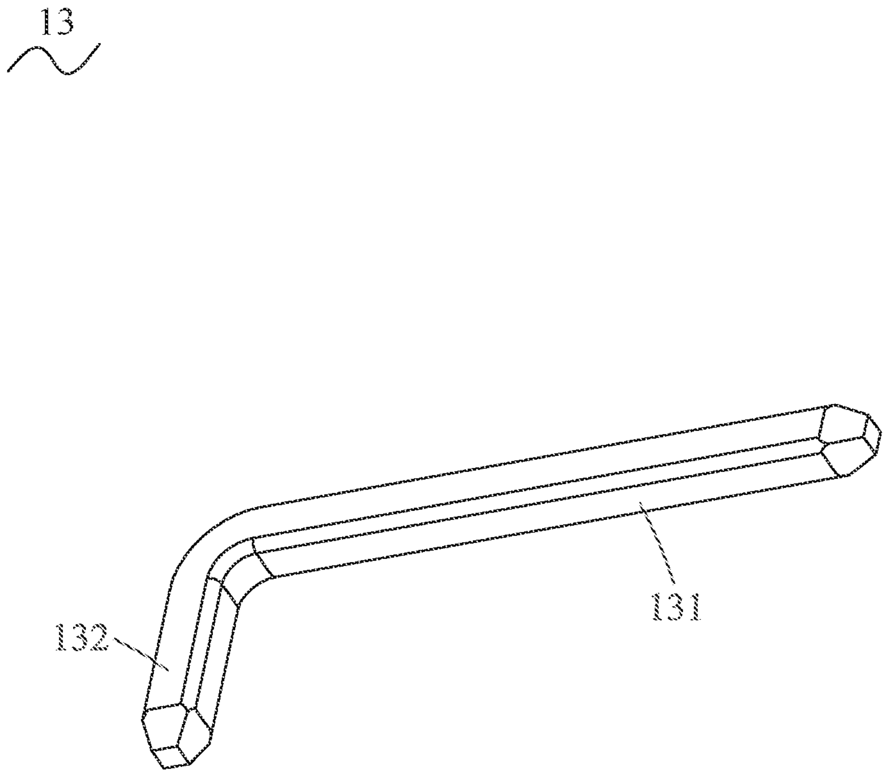
FIG. 6 is a perspective view of a first terminal of the plug connector of the board-to-board connector assembly of FIG. 1.
Figure 7:
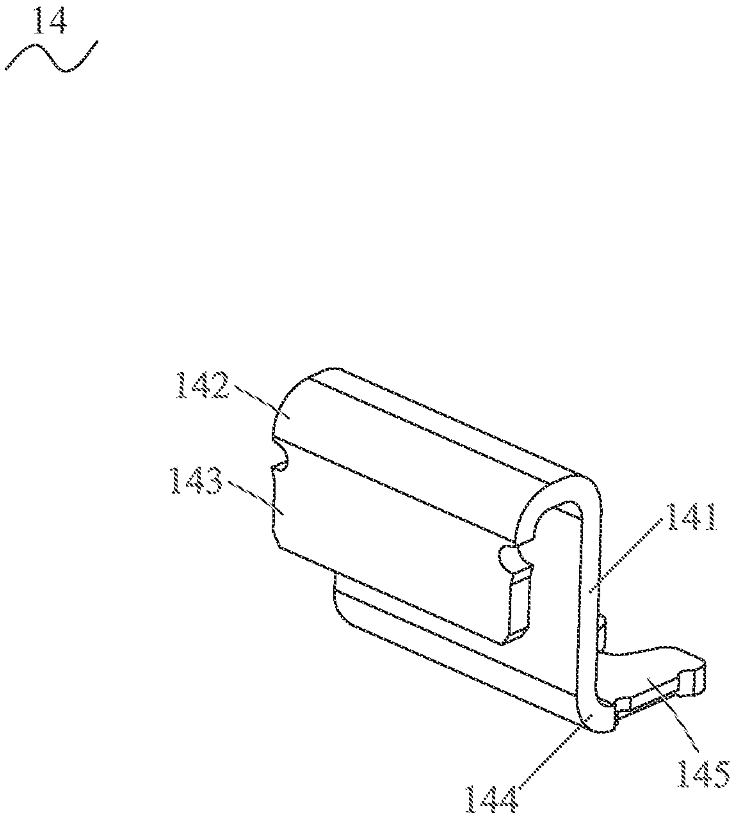
FIG. 7 is a perspective view of a first fastening element of the plug connector of the board-to-board connector assembly of FIG. 1.
Figure 8:
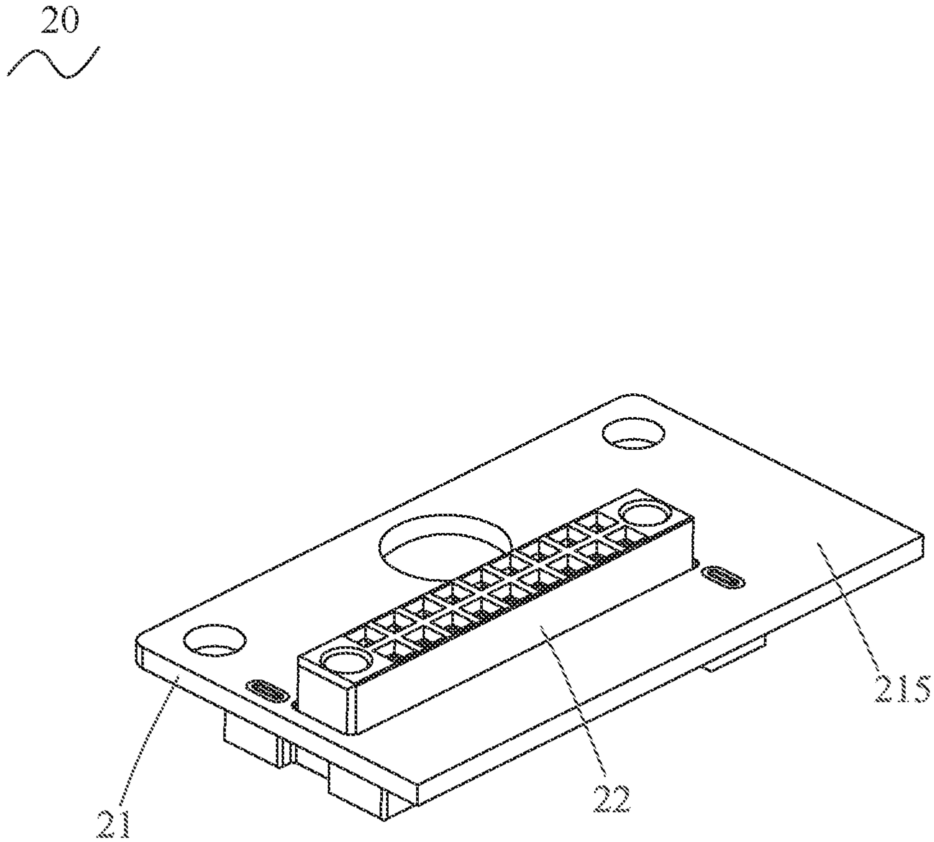
FIG. 8 is a perspective view of a socket connector of the board-to-board connector assembly of FIG. 1.
Figure 9:
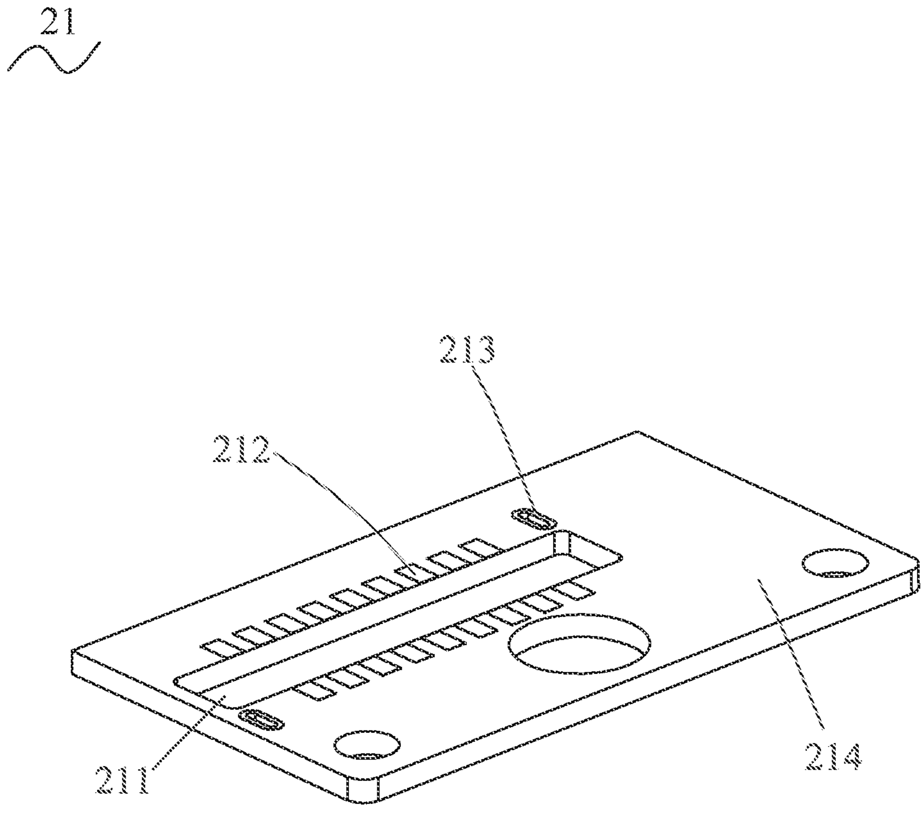
FIG. 9 is a perspective view of a second printed circuit board of the socket connector of the board-to-board connector assembly of FIG. 1.
Figure 10:
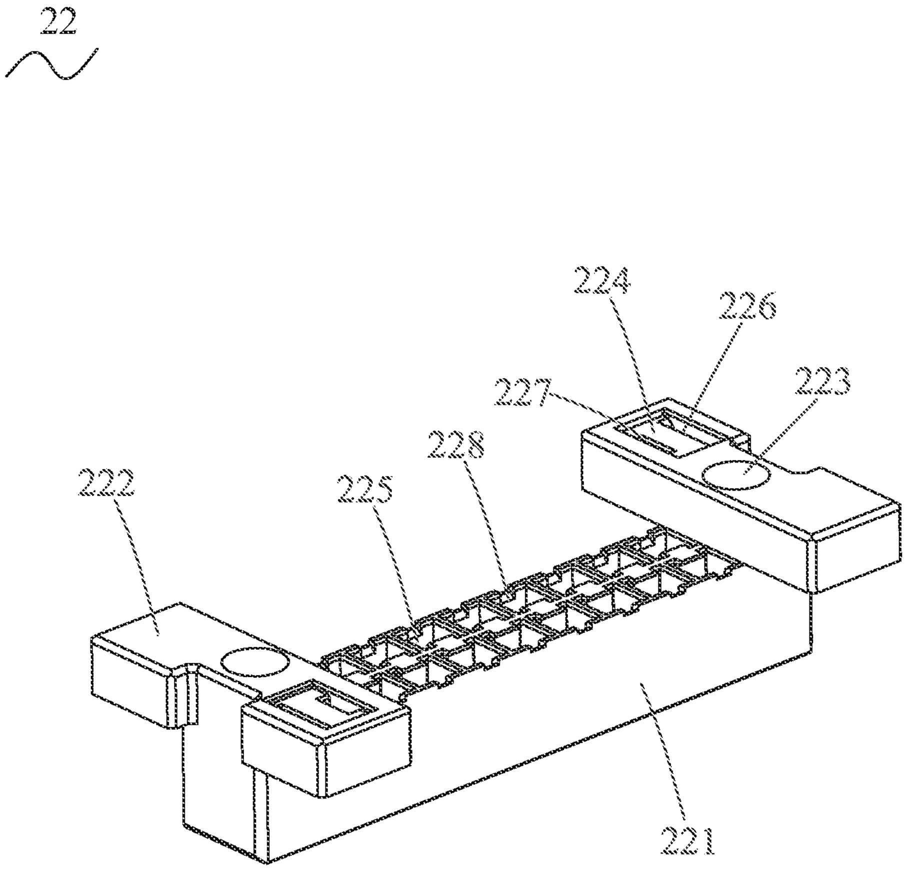
FIG. 10 is a perspective view of a second insulating housing of the socket connector of the board-to-board connector assembly of FIG. 1.
Figure 11:
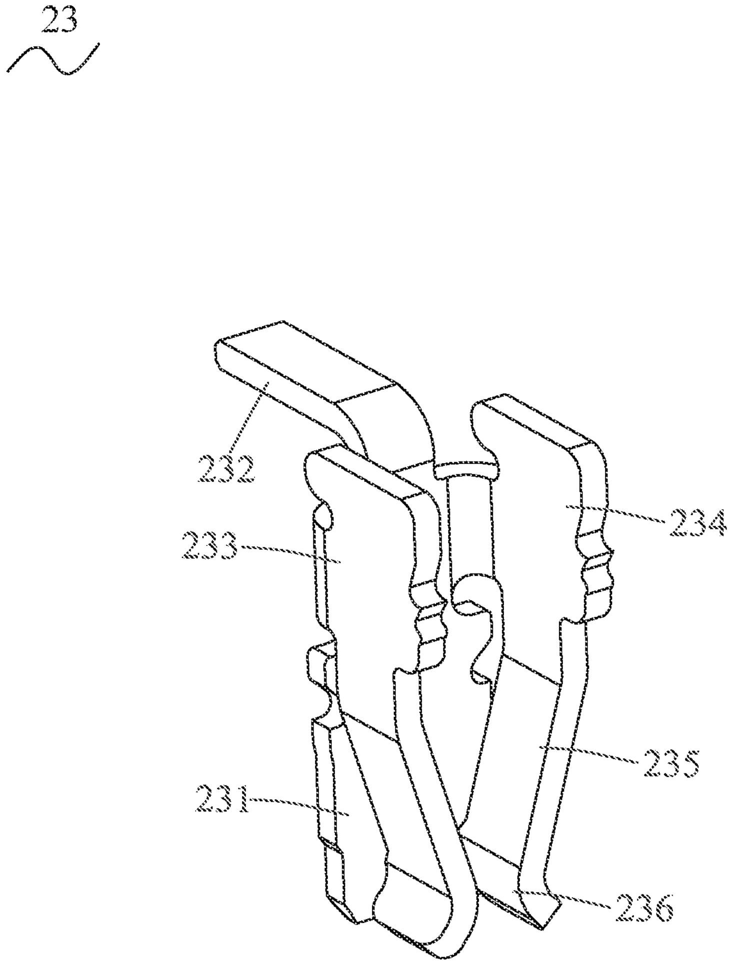
FIG. 11 is a perspective view of a second terminal of the socket connector of the board-to-board connector assembly of FIG. 1.
Figure 12:
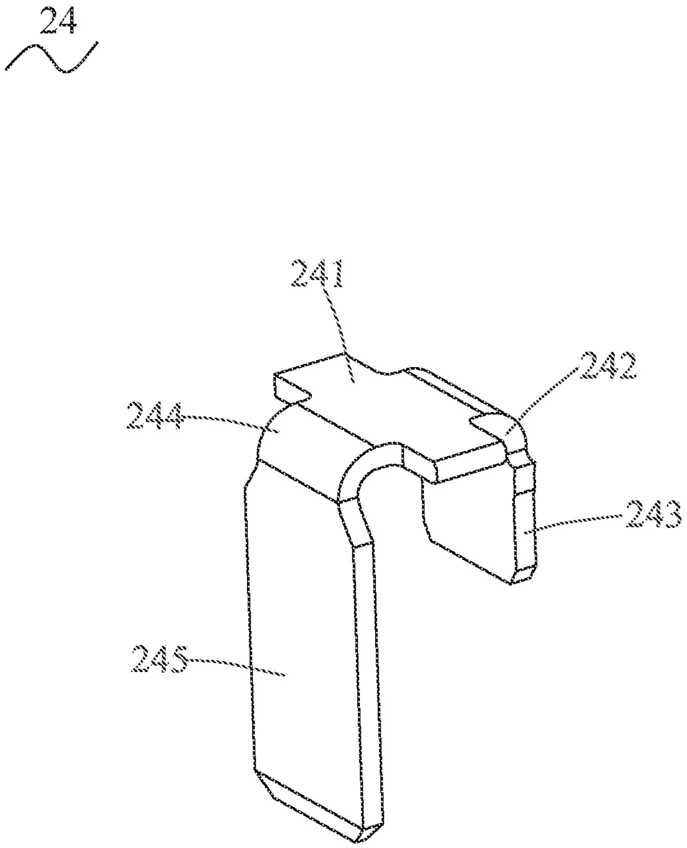
FIG. 12 is a perspective view of a second fastening element of the socket connector of the board-to-board connector assembly of FIG. 1.

Referring to FIG. 4 to FIG. 6, the plurality of the first terminals 13 are fastened to the first insulating housing 12. The plurality of the first terminals 13 are transversely arranged in two rows. Each first terminal 13 has a first contacting portion 131 and a first soldering portion 132. The first contacting portion 131 is elongated. A bottom end of the first contacting portion 131 is bent outward to form the first soldering portion 132. The bottom end of the first contacting portion 131 is surrounded by the first base portion 121 of the first insulating housing 12. The first soldering portion 132 is exposed outside of the bottom surface of the first base portion 121 of the first insulating housing 12. The first contacting portion 131 of each first terminal 13 is inserted in one second terminal 23. The first contacting portion 131 of each first terminal 13 is fastened in the one second terminal 23. The first soldering portions 132 of the plurality of the first terminals 13 are disposed on the first mounting surface 114 of the first printed circuit board 11. The first soldering portions 132 of the plurality of the first terminals 13 are soldered to the plurality of the first soldering zones 112 of the first printed circuit board 11. The first soldering portions 132 of the plurality of the first terminals 13 are located under the plurality of the lacking grooves 125. The first soldering portions 132 of the plurality of the first terminals 13 are corresponding to the plurality of the lacking grooves 125 of the first insulating housing 12. In the concrete implementation, the first soldering portions 132 of the plurality of the first terminals 13 are without being limited to be corresponding to the plurality of the lacking grooves 125 of the first insulating housing 12.

Referring to FIG. 3 to FIG. 7, each first fastening element 14 has a first main portion 141, a first bending portion 142, a first assembling portion 143, a second bending portion 144 and a first soldering foot 145. In the preferred embodiment, the two first main portions 141 of the two first fastening elements 14 are disposed to a front surface and a rear surface of the first base portion 121 of the first insulating housing 12, respectively. A top end of the first main portion 141 is bent inward to form the first bending portion 142. The two first bending portions 142 of the two first fastening elements 14 are fastened to the front end and the rear end of the top surface of the first base portion 121 of the first insulating housing 12. An inner end of the first bending portion 142 extends downward to form the first assembling portion 143. The top end of the first main portion 141 is connected with the first assembling portion 143 via the first bending portion 142. The two first assembling portions 143 of the two first fastening elements 14 are inserted into the two first locating grooves 124 of the first insulating housing 12 to realize that the two first fastening elements 14 are located to the first insulating housing 12, and the two first fastening elements 14 are fastened to the first insulating housing 12. A bottom end of the first main portion 141 is bent outward to form the second bending portion 144. An outer end of the second bending portion 144 extends outward to form the first soldering foot 145. The bottom end of the first main portion 141 is connected with the first soldering foot 145 via the second bending portion 144. The two first soldering feet 145 of the two first fastening elements 14 are fastened to the two first location portions 113 of the first printed circuit board 11. A bending direction of the first bending portion 142 is opposite to a bending direction of the second bending portion 144.

Referring to FIG. 2 to FIG. 9, the second printed circuit board 21 has a penetrating groove 211, a plurality of second soldering zones 212, two second location portions 213, a second mounting surface 214 and a mating surface 215. In the preferred embodiment, a top surface of the second printed circuit board 21 is defined as the second mounting surface 214, and a bottom surface of the second printed circuit board 21 is defined as the mating surface 215. The second mounting surface 214 of the second printed circuit board 21 faces away from the first mounting surface 114 of the first printed circuit board 11. The mating surface 215 of the second printed circuit board 21 faces the first mounting surface 114 of the first printed circuit board 11.

In the preferred embodiment, the second mounting surface 214 and a top surface of the socket connector 20 face towards the same direction. The mating surface 215 and a bottom surface of the socket connector 20 face towards the same direction. The mating surface 215 and the bottom surface of the socket connector 20 face the first mounting surface 114 of the first printed circuit board 11. The second mounting surface 214 and the top surface of the socket connector 20 face away from the first mounting surface 114 of the first printed circuit board 11. The second printed circuit board 21 has the penetrating groove 211 penetrating through the second mounting surface 214 and the mating surface 215 of the second printed circuit board 21. The penetrating groove 211 extends longitudinally. The second insulating housing 22 passes through the penetrating groove 211. The second mounting surface 214 has the plurality of the second soldering zones 212. The top surface of the second printed circuit board 21 has the plurality of the second soldering zones 212. The plurality of the second soldering zones 212 are disposed to two top surfaces of two opposite side walls of the penetrating groove 211, respectively. The plurality of the second soldering zones 212 are disposed along two long sides of the penetrating groove 211, respectively.

Corresponding mechanisms of the plurality of the second terminals 23 are soldered to the plurality of the second soldering zones 212. The two second location portions 213 penetrate through the second mounting surface 214 and the mating surface 215 of the second printed circuit board 21. The two second location portions 213 penetrate through the top surface and the bottom surface of the second printed circuit board 21. The two second location portions 213 penetrate through the second mounting surface 214 and the mating surface 215 of the second printed circuit board 21. Two corresponding mechanisms of the two second fastening elements 24 penetrate through the two second location portions 213. The two second location portions 213 are disposed adjacent to a front end and a rear end of the penetrating groove 211, respectively. The two second location portions 213 are located at a front end of the top surface of one side wall and a rear end of the top surface of the other side wall of the penetrating groove 211, respectively. The two second location portions 213 are located at a front end of one long side and a rear end of the other long side of the penetrating groove 211, respectively.

Referring to FIG. 3 to FIG. 10, the second insulating housing 22 is disposed to the second mounting surface 214. The second insulating housing 22 has a second base portion 221, two mounting portions 222, two perforations 223, two concave surfaces 224 and a plurality of terminal slots 225. A front end and a rear end of a top surface of the second base portion 221 extend upward and oppositely extend sideward to form two mounting portions 222, respectively. The two mounting portions 222 are disposed to the front end and the rear end of the top surface of the second base portion 221, respectively. The second insulating housing 22 passes through the penetrating groove 211 and then projects beyond the mating surface 215. The second base portion 221 passes through the penetrating groove 211 of the second printed circuit board 21, and then the second base portion 221 protrudes beyond the mating surface 215 of the second printed circuit board 21. The second base portion 221 is docked with the first insulating housing 12 of the plug connector 10. The two mounting portions 222 are disposed on the second mounting surface 214 of the second printed circuit board 21. The two perforations 223 penetrate through the two mounting portions 222, and a front end and a rear end of the second base portion 221, respectively. The two perforations 223 penetrate through a front end and a rear end of the second insulating housing 22, respectively. The two perforations 223 of the socket connector 20 are corresponding to the two first fastening pillars 122 of the first insulating housing 12 of the plug connector 10, respectively.

When the plug connector 10 is connected with the socket connector 20, the two first fastening pillars 122 of the first insulating housing 12 of the plug connector 10 are inserted into the two perforations 223 of the socket connector 20 to realize that the socket connector 20 is located to the plug connector 10. The second insulating housing 22 is connected with the first insulating housing 12. The two perforations 223 penetrate through the top surface and a bottom surface of the second insulating housing 22. The two first fastening pillars 122 are inserted into the two perforations 223 by sighting from the top surface of the second insulating housing 22. Two top surfaces of two opposite ends of the second insulating housing 22 are recessed downward to form two concave surfaces 224, respectively. One side of a top surface of each mounting portion 222 is recessed downward to form a concave surface 224. The two second fastening elements 24 are fastened in the two concave surfaces 224 of the second insulating housing 22, respectively. The plurality of the terminal slots 225 penetrate through the top surface and a bottom surface of the second base portion 221 of the second insulating housing 22. The plurality of the terminal slots 225 are transversely arranged in two rows. The plurality of the second terminals 23 are inserted into the plurality of the terminal slots 225 from the top surface of the second base portion 221. The plurality of the second terminals 23 are transversely arranged in two rows. A middle of an outer side of each terminal slot 225 is recessed downward to form a concave groove 228. A corresponding mechanism of each second terminal 23 is disposed in the concave groove 228 of one terminal slot 225.

Two outer ends of the two concave surfaces 224 define two first buckling grooves 226 vertically penetrating through the two opposite ends of the second insulating housing 22. The two outer ends of the two concave surfaces 224 of the two mounting portions 222 define the two first buckling grooves 226 penetrating downward through two bottom surfaces of the two mounting portions 222. Two corresponding structures of the two second fastening elements 24 are disposed in the two first buckling grooves 226. The two corresponding structures of the two second fastening elements 24 are exposed to the two top surfaces of the two mounting portions 222. The two first buckling grooves 226 are corresponding to the two second location portions 213 of the second printed circuit board 21. Two inner ends of the two concave surfaces 224 are recessed downward to form two second buckling grooves 227. Two corresponding segments of the two second fastening elements 24 are disposed in the two second buckling grooves 227 to realize that the two second fastening elements 24 are located to the second insulating housing 22, and the two second fastening elements 24 are fixed to the second insulating housing 22. The plurality of the terminal slots 225 are closer to the two second buckling grooves 227 than to the two first buckling grooves 226.

Referring to FIG. 8 to FIG. 13, each second terminal 23 has a fastening portion 231, a second soldering portion 232 and two side arms 233. The fastening portions 231 of the plurality of the second terminals 23 are disposed in the plurality of the terminal slots 225 of the second insulating housing 22. A top end of the fastening portion 231 is bent outward to form the second soldering portion 232. The fastening portion 231 of each second terminal 23 is disposed to one side of the concave groove 228 of one terminal slot 225 of the second insulating housing 22, so that the second soldering portion 232 of each second terminal 23 is fastened in the concave groove 228 of the one terminal slot 225 of the second insulating housing 22. The second soldering portions 232 of the plurality of the second terminals 23 are soldered to the plurality of the second soldering zones 212 of the second printed circuit board 21. The second soldering portions 232 of the plurality of the second terminals 23 are fastened on the second mounting surface 214 of the second printed circuit board 21.

The second soldering portions 232 of the plurality of the second terminals 23 are exposed out of the penetrating groove 211 of the second printed circuit board 21. Two opposite sides of the fastening portion 231 are bent opposite to the second soldering portion 232 to form the two side arms 233, respectively. Each side arm 233 has a fastening end 234, an extending end 235 and a bending end 236. Each side of the fastening portion 231 is bent opposite to the second soldering portion 232 and extends downward to form the fastening end 234. In each second terminal 23, the two fastening ends 234 of the two side arms 233 are connected with the fastening portion 231. Two bottom ends of the two fastening ends 234 of each second terminal 23 slantwise extend inward and downward to form two extending ends 235. Two bottom ends of the two extending ends 235 of each second terminal 23 are arched inward to form two bending ends 236. The two fastening ends 234 of each second terminal 23 are opposite to each other. The two extending ends 235 of each second terminal 23 are opposite to each other. The two bending ends 236 of each second terminal 23 are opposite to each other. In the preferred embodiment, the first contacting portion 131 of each first terminal 13 is disposed between the two side arms 233 of the one second terminal 23. The first contacting portion 131 of each first terminal 13 is clamped between the two bending ends 236 of the one second terminal 23. Two opposite surfaces of the first contacting portion 131 of each first terminal 13 abut against the two bending ends 236 of the one second terminal 23.

Referring to FIG. 8 to FIG. 14, each second fastening element 24 has a second main portion 241, a third bending portion 242, a second assembling portion 243, a fourth bending portion 244 and a second soldering foot 245. The two second main portions 241 of the two second fastening elements 24 are disposed on the two concave surfaces 224 of the two mounting portions 222 of the second insulating housing 22. One end of the second main portion 241 is bent downward to form the third bending portion 242. A bottom end of the third bending portion 242 extends downward to form the second assembling portion 243. The one end of the second main portion 241 is connected with the second assembling portion 243 via the third bending portion 242. The two second assembling portions 243 of the two second fastening elements 24 are disposed in the two second buckling grooves 227 of the second insulating housing 22. The other end of the second main portion 241 is bent downward to form the fourth bending portion 244. A bottom end of the fourth bending portion 244 extends downward to form the second soldering foot 245. The other end of the second main portion 241 is connected with the second soldering foot 245 via the fourth bending portion 244. The two second soldering feet 245 pass downward through the two first buckling grooves 226 of the second insulating housing 22 and the two second location portions 213 of the second printed circuit board 21. The two second soldering feet 245 are exposed out of the mating surface 215 of the second printed circuit board 21. The two second soldering feet 245 project out of two lower portions of the second insulating housing 22. The two second soldering feet 245 penetrate through the second printed circuit board 21, and the two second soldering feet 245 project beyond the mating surface 215.

As described above, the two mounting portions 222 of the second insulating housing 22 of the socket connector 20 are disposed on the second mounting surface 214 of the second printed circuit board 21, and the second base portion 221 of the second insulating housing 22 passes through the penetrating groove 211 of the second printed circuit board 21 to effectively reduce the distance between the first printed circuit board 11 and the second printed circuit board 21, so the board-to-board connector assembly 100 is capable of reducing a distance between two printed circuit boards of the board-to-board connector assembly 100 which are the first printed circuit board 11 and the second printed circuit board 21, and an assembly space between the first printed circuit board 11 and the second printed circuit board 21 of the board-to-board connector assembly 100 is decreased. Furthermore, the two second soldering feet 245 of the two second fastening elements 24 of the socket connector 20 penetrate through the two first buckling grooves 226 of the two mounting portions 222 of the second insulating housing 22 and the two second location portions 213 of the second printed circuit board 21, and the two second soldering feet 245 of the two second fastening elements 24 of the socket connector 20 are soldered in the two second location portions 213 of the second printed circuit board 21, so the socket connector 20 is more stably mounted on the second printed circuit board 21. In addition, when the board-to-board connector assembly 100 is assembled, the two first fastening pillars 122 of the first insulating housing 12 of the plug connector 10 are inserted into the two perforations 223 of the second insulating housing 22 from the bottom surface of the second insulating housing 22 of the socket connector 20, the two perforations 223 penetrate through the top surface of the second insulating housing 22. Thus, whether the two first fastening pillars 122 of the first insulating housing 12 are inserted into the two perforations 223 of the second insulating housing 22 from the top surface of the second insulating housing 22 is sighted so as to judge whether the board-to-board connector assembly 100 completes aligning a position.

What is claimed is:

1. A board-to-board connector assembly, comprising:

a plug connector, including:

a first printed circuit board, a top surface of the first printed circuit board being defined as a first mounting surface;

a first insulating housing disposed on the first mounting surface, two opposite ends of the first insulating housing having two first locating grooves penetrating through a top surface and a bottom surface of the first insulating housing, respectively;

a plurality of first terminals mounted in the first insulating housing; and two first fastening elements fastened to two opposite ends of the first insulating housing, respectively, each first fastening element having a first main portion, a top end of the first main portion being connected with a first assembling portion, a bottom end of the first main portion being connected with a first soldering foot, the two first assembling portions of the two first fastening elements being inserted into the two first locating grooves; and a socket connector docked with the plug connector, the socket connector including:

a second printed circuit board, a top surface of the second printed circuit board being defined as a second mounting surface, a bottom surface of the second printed circuit board being defined as a mating surface, the second mounting surface facing away from the first mounting surface, the mating surface facing the first mounting surface, the second printed circuit board having a penetrating groove penetrating through the second mounting surface and the mating surface;

a second insulating housing disposed to the second mounting surface, the second insulating housing passing through the penetrating groove and then projecting beyond the mating surface, the second insulating housing being connected with the first insulating housing, two top surfaces of two opposite ends of the second insulating housing being recessed downward to form two concave surfaces, respectively, two outer ends of the two concave surfaces defining two first buckling grooves vertically penetrating through the two opposite ends of the second insulating housing, two inner ends of the two concave surfaces being recessed downward to form two second buckling grooves;

a plurality of second terminals disposed in the second insulating housing, the plurality of the second terminals being connected with the plurality of the first terminals; and two second fastening elements fastened in the two concave surfaces of the second insulating housing, respectively, each second fastening element having a second main portion, the two second main portions of the two second fastening elements being disposed on the two concave surfaces, one end of the second main portion being connected with a second assembling portion, the two second assembling portions of the two second fastening elements being disposed in the two second buckling grooves of the second insulating housing, the other end of the second main portion being connected with a second soldering foot, the two second soldering feet passing downward through the two first buckling grooves of the second insulating housing, the two second soldering feet projecting out of two lower portions of the second insulating housing, the two second soldering feet penetrating through the second printed circuit board, and the two second soldering feet projecting beyond the mating surface.

2. The board-to-board connector assembly as claimed in claim 1, wherein the first insulating housing has a first base portion, a front end and a rear end of a top surface of the first base portion extend upward to form two first fastening pillars, respectively, a front end and a rear end of a bottom surface of the first base portion extend downward to form two second fastening pillars, respectively, the second insulating housing has two perforations penetrating through a front end and a rear end of the second insulating housing, respectively, the first printed circuit board has two location holes penetrating through the first mounting surface and a bottom surface of the first printed circuit board, the two perforations are corresponding to the two first fastening pillars, respectively, the two first fastening pillars are inserted into the two perforations, the two location holes are corresponding to the two second fastening pillars, the two second fastening pillars are disposed in the two location holes.

3. The board-to-board connector assembly as claimed in claim 2, wherein the second insulating housing has a second base portion, a front end and a rear end of a top surface of the second base portion extend upward and oppositely extend sideward to form two mounting portions, respectively, the two mounting portions are disposed on the second mounting surface of the second printed circuit board, the second base portion passes through the penetrating groove of the second printed circuit board, and then the second base portion protrudes beyond the mating surface of the second printed circuit board.

4. The board-to-board connector assembly as claimed in claim 3, wherein the two first fastening pillars are corresponding to the two second fastening pillars along an up-down direction, the two first fastening pillars are aligned with the two second fastening pillars along the up-down direction, the two perforations penetrate through the two mounting portions, and a front end and a rear end of the second base portion, respectively.

5. The board-to-board connector assembly as claimed in claim 2, wherein the two first fastening elements are disposed on the first mounting surface, the two first main portions of the two first fastening elements are disposed to a front surface and a rear surface of the first base portion of the first insulating housing, respectively, a top end of the first main portion is bent inward to form a first bending portion, the two first bending portions of the two first fastening elements are fastened to the front end and the rear end of the top surface of the first base portion of the first insulating housing, an inner end of the first bending portion extends downward to form the first assembling portion, a bottom end of the first main portion is bent outward to form a second bending portion, an outer end of the second bending portion extends outward to form the first soldering foot, a front end and a rear end of the first mounting surface of the first printed circuit board have two first location portions, respectively, the two first soldering feet of the two first fastening elements are fastened to the two first location portions.

6. The board-to-board connector assembly as claimed in claim 5, wherein a bending direction of the first bending portion is opposite to a bending direction of the second bending portion.

7. The board-to-board connector assembly as claimed in claim 5, wherein one side of a top surface of each mounting portion is recessed downward to form the concave surface, one end of the second main portion is bent downward to form a third bending portion, a bottom end of the third bending portion extends downward to form the second assembling portion, the other end of the second main portion is bent downward to form a fourth bending portion, a bottom end of the fourth bending portion extends downward to form the second soldering foot, the two outer ends of the two concave surfaces of the two mounting portions define the two first buckling grooves penetrating downward through two bottom surfaces of the two mounting portions.

8. The board-to-board connector assembly as claimed in claim 5, wherein the second printed circuit board has two second location portions penetrating through the second mounting surface and the mating surface of the second printed circuit board, the two first buckling grooves are corresponding to the two second location portions, the two second location portions are located at a front end of one long side and a rear end of the other long side of the penetrating groove, respectively, the two second soldering feet pass downward through the two first buckling grooves of the second insulating housing and the two second location portions of the second printed circuit board, the two second soldering feet are exposed out of the mating surface of the second printed circuit board.

9. The board-to-board connector assembly as claimed in claim 1, wherein each first terminal has a first contacting portion, a bottom end of the first contacting portion is bent outward to form a first soldering portion, the first insulating housing has a first base portion, the bottom end of the first contacting portion is surrounded by the first base portion of the first insulating housing, the first soldering portion is exposed outside of a bottom surface of the first base portion of the first insulating housing, the first soldering portions of the plurality of the first terminals are disposed on the first mounting surface of the first printed circuit board.

10. The board-to-board connector assembly as claimed in claim 9, wherein each second terminal has a fastening portion, a top end of the fastening portion is bent outward to form a second soldering portion, two opposite sides of the fastening portion are bent opposite to the second soldering portion to form two side arms, respectively, the fastening portions of the plurality of the second terminals are disposed in the second insulating housing, the second soldering portions of the plurality of the second terminals are fastened on the second mounting surface of the second printed circuit board, the first contacting portion of each first terminal is disposed between the two side arms of one second terminal.

11. The board-to-board connector assembly as claimed in claim 10, wherein each side arm has a fastening end, an extending end and a bending end, each side of the fastening portion is bent opposite to the second soldering portion and extends downward to form the fastening end, in each second terminal, the two fastening ends of the two side arms are connected with the fastening portion, two bottom ends of the two fastening ends of each second terminal slantwise extend inward and downward to form two extending ends, two bottom ends of the two extending ends of each second terminal are arched inward to form two bending ends, two fastening ends of each second terminal are opposite to each other, the two extending ends of each second terminal are opposite to each other, the two bending ends of each second terminal are opposite to each other, two opposite surfaces of the first contacting portion of each first terminal abut against the two bending ends of the one second terminal.

12. The board-to-board connector assembly as claimed in claim 10, wherein the second insulating housing has a second base portion, and a plurality of terminal slots penetrating through a top surface and a bottom surface of the second base portion of the second insulating housing, the plurality of the second terminals are inserted into the plurality of the terminal slots, a middle of an outer side of each terminal slot is recessed downward to form a concave groove, the fastening portion of each second terminal is disposed to one side of the concave groove of one terminal slot, the second soldering portion of each second terminal is fastened in the concave groove of the one terminal slot.

13. A board-to-board connector assembly, comprising:

a plug connector, including:

a first printed circuit board, a top surface of the first printed circuit board being defined as a first mounting surface, the first printed circuit board having two location holes penetrating through the first mounting surface and a bottom surface of the first printed circuit board;

a first insulating housing disposed on the first mounting surface, the first insulating housing having a first base portion, a front end and a rear end of a top surface of the first base portion extending upward to form two first fastening pillars, respectively, a front end and a rear end of a bottom surface of the first base portion extending downward to form two second fastening pillars, respectively, the two first fastening pillars being corresponding to the two second fastening pillars along an up-down direction, the two location holes being corresponding to the two second fastening pillars, the two second fastening pillars being disposed in the two location holes;

a plurality of first terminals mounted in the first insulating housing; and two first fastening elements fastened to two opposite ends of the first insulating housing, respectively; and a socket connector docked with the plug connector, the socket connector including:

a second printed circuit board, a top surface of the second printed circuit board being defined as a second mounting surface, a bottom surface of the second printed circuit board being defined as a mating surface, the second mounting surface facing away from the first mounting surface, the mating surface facing the first mounting surface, the second printed circuit board having a penetrating groove penetrating through the second mounting surface and the mating surface;

a second insulating housing disposed to the second mounting surface, the second insulating housing passing through the penetrating groove and then projecting beyond the mating surface, the second insulating housing being connected with the first insulating housing, the second insulating housing having a second base portion, a front end and a rear end of a top surface of the second base portion extending upward and oppositely extending sideward to form two mounting portions, respectively, the two mounting portions being disposed to the second mounting surface of the second circuit board, the second base portion passing through the penetrating groove of the second printed circuit board, and then the second base portion protruding beyond the mating surface of the second printed circuit board, the second insulating housing having two perforations penetrating through the two mounting portions, and a front end and a rear end of the second base portion, respectively, the two perforations being corresponding to the two first fastening pillars, respectively, the two first fastening pillars being inserted into the two perforations;

a plurality of second terminals disposed in the second insulating housing, the plurality of the second terminals being connected with the plurality of the first terminals; and two second fastening elements disposed to a front end and a rear end of a top surface of the second insulating housing.

14. The board-to-board connector assembly as claimed in claim 13, wherein the two first fastening elements are disposed on the first mounting surface, each first fastening element has a first main portion, the two first main portions of the two first fastening elements are disposed to a front surface and a rear surface of the first base portion of the first insulating housing, respectively.

15. The board-to-board connector assembly as claimed in claim 14, wherein a top end of the first main portion is bent inward to form a first bending portion, the two first bending portions of the two first fastening elements are fastened to the front end and the rear end of the top surface of the first base portion of the first insulating housing, an inner end of the first bending portion extends downward to form a first assembling portion, two opposite ends of the first insulating housing have two first locating grooves penetrating through a top surface and a bottom surface of the first insulating housing, respectively, the two first assembling portions of the two first fastening elements are inserted into the two first locating grooves.

16. The board-to-board connector assembly as claimed in claim 15, wherein a bottom end of the first main portion is bent outward to form a second bending portion, an outer end of the second bending portion extends outward to form a first soldering foot, a front end and a rear end of the first mounting surface of the first printed circuit board have two first location portions, respectively, the two first soldering feet of the two first fastening elements are fastened to the two first location portions.

17. The board-to-board connector assembly as claimed in claim 15, wherein the second printed circuit board has two second location portions penetrating through the second mounting surface and the mating surface of the second printed circuit board, one side of a top surface of each mounting portion is recessed downward to form a concave surface, each second fastening element has a second main portion, the two second main portions of the two second fastening elements are disposed on the two concave surfaces of the two mounting portions, one end of the second main portion is bent downward to form a third bending portion, a bottom end of the third bending portion extends downward to form a second assembling portion, the other end of the second main portion is bent downward to form a fourth bending portion, a bottom end of the fourth bending portion extends downward to form a second soldering foot, two outer ends of the two concave surfaces of the two mounting portions define two first buckling grooves penetrating downward through two bottom surfaces of the two mounting portions.

18. A board-to-board connector assembly, comprising:

a plug connector, including:

a first printed circuit board, a top surface of the first printed circuit board being defined as a first mounting surface, a front end and a rear end of the first mounting surface of the first printed circuit board having two first location portions, respectively;

a first insulating housing disposed on the first mounting surface, the first insulating housing having a first base portion, two opposite ends of the first insulating housing having two first locating grooves penetrating through a top surface and a bottom surface of the first insulating housing, respectively;

a plurality of first terminals mounted in the first insulating housing; and two first fastening elements fastened to two opposite ends of the first insulating housing, respectively, each first fastening element having a first main portion, the two first main portions of the two first fastening elements being disposed to a front surface and a rear surface of the first base portion of the first insulating housing, respectively, a top end of the first main portion being bent inward to form a first bending portion, the two first bending portions of the two first fastening elements being fastened to a front end and a rear end of a top surface of the first base portion of the first insulating housing, an inner end of the first bending portion extending downward to form a first assembling portion, the two first assembling portions of the two first fastening elements being inserted into the two first locating grooves, a bottom end of the first main portion being bent outward to form a second bending portion, an outer end of the second bending portion extending outward to form a first soldering foot, the two first soldering feet of the two first fastening elements being fastened to the two first location portions, a bending direction of the first bending portion being opposite to a bending direction of the second bending portion; and a socket connector docked with the plug connector, the socket connector including:

a second printed circuit board, a top surface of the second printed circuit board being defined as a second mounting surface, a bottom surface of the second printed circuit board being defined as a mating surface, the second mounting surface facing away from the first mounting surface, the mating surface facing the first mounting surface, the second printed circuit board having a penetrating groove penetrating through the second mounting surface and the mating surface;

a second insulating housing disposed to the second mounting surface, the second insulating housing passing through the penetrating groove and then projecting beyond the mating surface, the second insulating housing being connected with the first insulating housing, two top surfaces of two opposite ends of the second insulating housing being recessed downward to form two concave surfaces, respectively;

a plurality of second terminals disposed in the second insulating housing, the plurality of the second terminals being connected with the plurality of the first terminals; and two second fastening elements fastened in the two concave surfaces, respectively.

* * * * *